Dec. 9, 1952  M. W. OLSON  2,620,515
EXTRUSION METHOD AND APPARATUS
Filed Feb. 16, 1949  2 SHEETS—SHEET 1
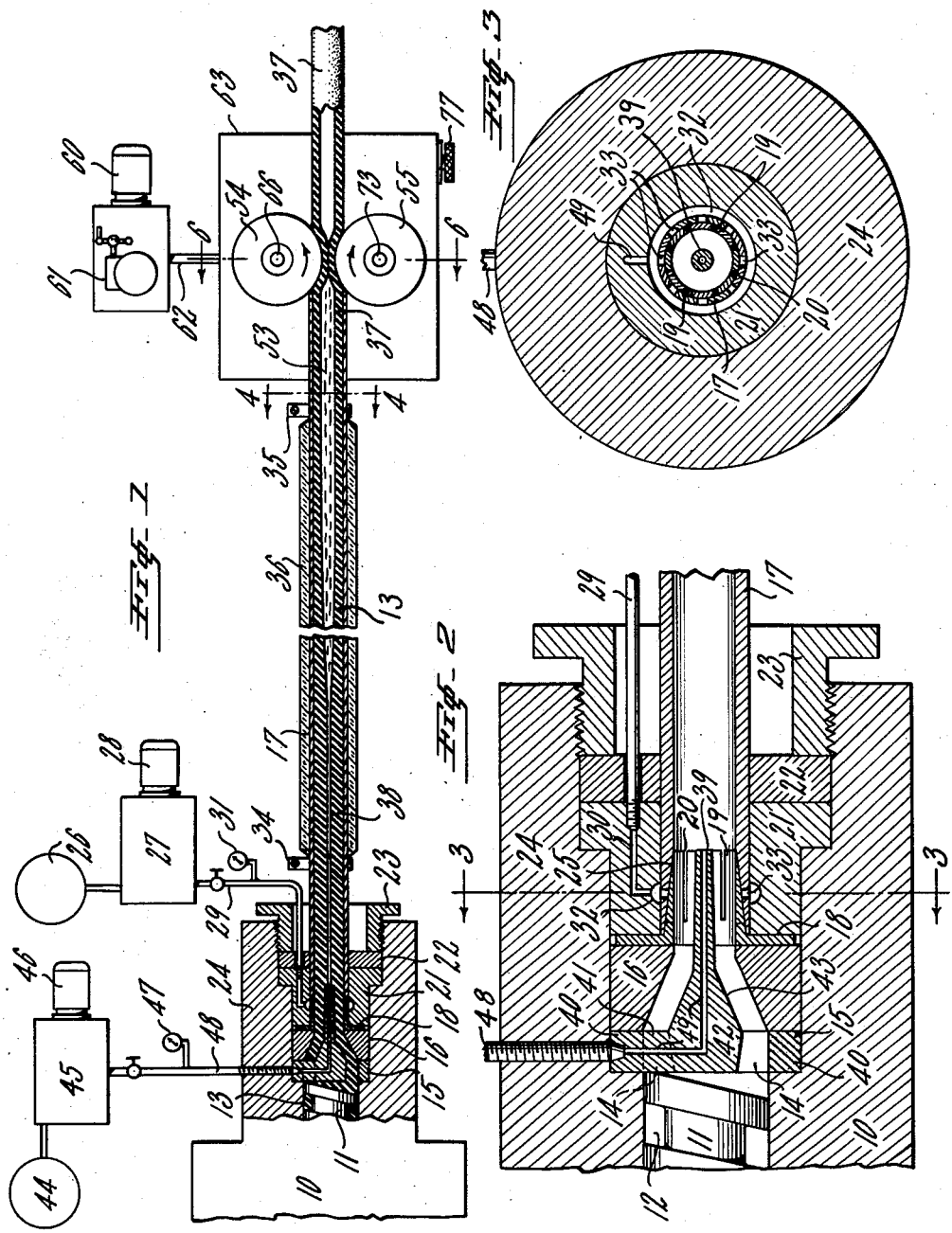
INVENTOR.
MARK W. OLSON
BY
Henry P. Truesdell
ATTORNEY Dec. 9, 1952 M. W. OLSON 2,620,515
EXTRUSION METHOD AND APPARATUS
Filed Feb. 16, 1949 2 SHEETS—SHEET 2
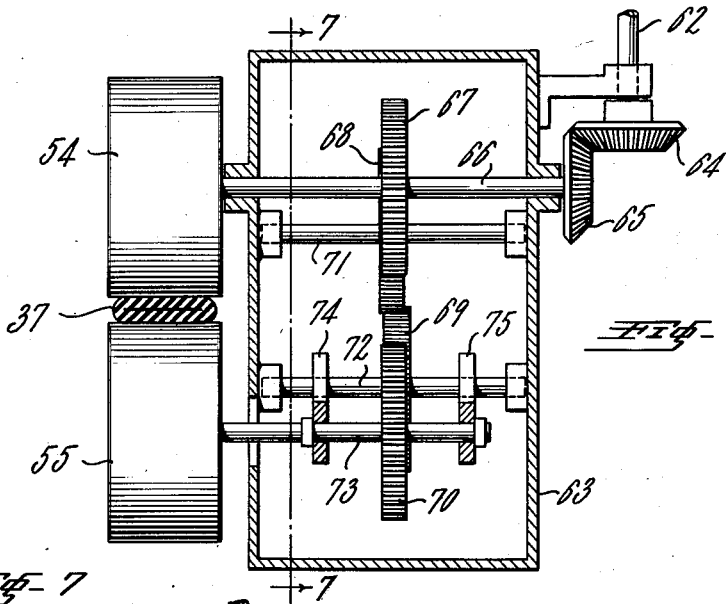
INVENTOR.
MARK W. OLSON
BY Henry P. Truesdell
ATTORNEY Patented Dec. 9, 1952

2,620,515

UNITED STATES PATENT OFFICE 2,620,515

EXTRUSION METHOD AND APPARATUS

Mark W. Olson, Allendale, N. J., assignor to United States Rubber Company, New York, N. Y., a corporation of New Jersey Application February 16, 1949, Serial No. 76,799

15 Claims. (Cl. 18—14)

This invention relates to a method and apparatus for the extrusion of rubber and other extrudable materials. More particularly, this invention relates to a method and means for extruding continuous lengths of hollow articles such as rubber tubing and the like.

One object of the invention is to provide a method and apparatus for the continuous extrusion of rubber hose or other tubular articles having smooth shiny surfaces free from blemishes, and in which the rubber has been confined to provide a dense homogeneous compound.

Another object of the invention is to provide a method and apparatus for shaping extrudable material into continuous lengths of articles having a hollow longitudinal cavity which is accurately centered with respect to the walls of the article.

A further object is the provision of a method and means for manufacturing rubber tubing, or the like, of various wall thicknesses.

It is another object of the invention to manufacture lengths of hollow articles from rubber or other materials by a method and apparatus capable, by simple adjustment, of producing articles of various wall thicknesses.

Still another object is the provision of an improved extruding mechanism for manufacturing continuous lengths of hollow articles from vulcanizable materials having means for vulcanizing the material during the extrusion, and which is capable of extruding various hollow articles in long lengths without jamming, tearing, or damage to the vulcanized stock.

It is also an object of the invention to manufacture plastic articles having a generally annular cross-section by extruding or forcing the plastic along a confining passageway, the passageway being lubricated to facilitate movement of the plastic without tearing or rupture or functional distortion.

Still a further object is to provide a method and apparatus for extruding lengths of shaped plastic articles having a longitudinal hollow cavity, by forming the desired cavity in the material while passing the material in a plastic, readily-deformable state through a confining passageway, and thereafter causing the material in the confining passageway to change to a relatively non-plastic state in which it is capable of retaining its shape.

Another object of the invention is to shape continuous lengths of hollow articles from plastic material by the agency of fluid pressure acting within the plastic material.

An extrusion apparatus constructed according to the present invention and adapted to illustrate the practice of the method of the invention is shown in the accompanying drawings, wherein:

Fig. 1 is a longitudinal section of an extruding apparatus for shaping and vulcanizing rubber tubing in an elongated lubricated confining tube in accordance with the present invention;

Fig. 2 is a similar view on a larger scale of part of the apparatus of Fig. 1;

Fig. 3 is a cross-sectional view of the apparatus taken along the line 3—3 of Fig. 2;

Fig. 4 is a cross-sectional view taken along the line 4—4 of Fig. 1;

Fig. 5 is a view, partly in section, showing the exit end of the confining tube in full;

Fig. 6 is a cross-sectional view taken substantially along the line 6—6 of Fig. 1;

Fig. 7 is a sectional view of part of the apparatus taken along the line 7—7 of Fig. 6, and Fig. 8 is a detailed view of part of the means for lubricating the elongated confining tube.

Broadly, the method of the present invention comprises a process for manufacturing tubing or other hollow articles from rubber or similar extrudable material, wherein the desired hollow or cavity within the article is created through the agency of fluid pressure exerted by a body of fluid within the material while it is being extruded in the plastic state. The method is further characterized by the fact that the said fluid pressure is exerted on the plastic material while it is being extruded through an elongated confining or shaping chamber. The plastic material fills out and conforms to the walls of the elongated chamber, and the wall of the chamber is supplied with lubricant, so that the plastic material advances along the chamber without sticking or tearing and the resulting article has a smooth shiny surface free from blemishes. If the article is being made from vulcanizable material, the said confining chamber is heated to effect vulcanization of the material before it issues from the confining chamber. Since the material in the chamber is under pressure, a dense, compacted, vulcanized article of good physical properties is obtained. If the article is being made from a material of thermoplastic nature, the chamber is equipped with suitable cooling means so that the material is cooled sufficiently to be in a relatively non-plastic, shape-retaining state on issuing from the confining chamber.

As shown in the accompanying drawings, suitable apparatus for carrying out the method of the invention includes an elongated die extension tube or confining chamber into which extrudable stock is fed in the plastic state by a screw stuffer or other suitable means. A stream of fluid, either a liquid, vapor or gas is introduced into the plastic material by a suitable positive pumping system. This fluid is caused to accumulate to form a stationary fluid bubble within the advancing plastic stock, thereby shaping the stock in the form of a tube. The wall thickness of the tube can be regulated through a wide range by a simple adjustment to be described in detail below. Thus, tubes of a variety of wall thicknesses can be manufactured in the same apparatus. This is in contrast to conventional tube manufacturing apparatus, wherein the wall of the tube is shaped by an annular die, a different size of die being required for each desired wall thickness. The tubing made in this apparatus is accurately centered and of exceptionally uniform wall thickness.

Turning now to the details of construction and referring to Figs. 1, 2 and 3 of the drawing, the apparatus for shaping and vulcanizing tubing, or the like, comprises a conventional extruder 10 having a feeding screw 11 which is rotated within a barrel or cylinder 12 by any suitable drive means (not shown). In order to maintain the vulcanizable rubber compound 13 being extruded at the proper working temperature, the extruder body 10 may be heated by any conventional means such as steam. Rotation of the screw 11 causes the heated plastic rubber stock 13, which is initially in a shapeless condition, to be forced along the barrel 12, through openings 14 in a spider ring assembly 15, and thence through a die member 16 into an elongated die extension tube, or confining chamber 17, in which the rubber stock 13 is shaped and vulcanized under pressure. The rubber stock 13 fills the die extension tube 17, and conforms to the walls thereof, because there is provided at the exit end of the tube 17 a restricting or snubbing device, to be described below, that permits the extruder feeding screw 11 to develop considerable back-pressure on the rubber stock within the tube.

In order to make possible the passage of the rubber stock 13 under pressure through the long die extension tube 17, which may be of great length, e. g., 10 to 50 feet, or even longer, means is provided for continuously applying a thin film of lubricant to the surface of the advancing rubber stock as it enters the tube 17, to prevent sticking of the rubber to the interior wall thereof. This means includes a lubricant applying ring 18, which is shown in Fig. 8 removed from the apparatus, and which has a number of tapered blades 19 extending outwardly therefrom. The blades are separated by slots 20. This lubricating ring assembly serves to spread lubricant, introduced under pressure, evenly over the surface of the passing rubber stock 13, and also serves to prevent the rubber from entering into and clogging the lubricant supply passages.

The lubricating ring 18 is held against the forward face of the die 16 by a collar 21 attached to the entrance end of the die extension tube 17. A retaining ring 22 and a threaded bushing 23 hold the tube 17 and lubricating ring 18 assembled in position on the extruder head 24. The tube 17 has a tapered section 25 at its entrance end which engages the tapered blades 19 of the lubricating ring 18, thereby forming a smooth continuous passage from the die 16 to the interior of the tube 17.

The lubricant to be applied to the rubber surface is supplied from a reservoir 26 by a variable speed positive pump 27, driven by a motor 28. The lubricant may be any suitable liquid which has anti-sticking properties and which is not deleterious to the rubber, such as silicone mold release fluid. A lubricant line 29 of fine bore connects the pump 27 with a passageway 30 within the collar 21 on the tube 17. A gauge 31 on the line 29 indicates the pressure of the lubricant. The lubricant passes from the passageway 30 into an annular distributing passageway 32 (Figs. 2 and 3) from which a series of radial holes 33 lead through the wall of the tube 17 to the lubricating ring blades 19. As the lubricant is forced under positive pressure by the pump 27 through these passageways, the blades 19 flex slightly away from the openings 33 and serve to distribute a thin film of lubricant evenly over the surface of the passing rubber 13. At the same time the blades 19, which are thin enough to flex somewhat under a relatively slight pressure differential, are capable of flexing against the radial lubricant openings 33, closing them off and preventing any of the rubber stock 13 from entering therein in the event that the pressure of the rubber stock exceeds the pressure of the lubricant. This action of the lubricating ring prevents breakdown of the lubricated extrusion operation due to clogging of the lubricant entrances 33 with rubber particles. Lubricated extrusion apparatus of this character is claimed in the copending application of the present inventor and C. A. Ferguson, Serial No. 61,654, filed November 23, 1948, and assigned to the same assignee as the instant application.

In order to effect vulcanization of the rubber stock 13 as it passes through the tube 17, the tube may be heated by virtue of its own electrical resistance to current introduced at terminals 34 and 35 at each end of the tube. The tube may be covered with suitable heat insulation 36.

For the purpose of shaping the plastic rubber mass 13 within the tube 17 into the desired form, namely, that of a hollow rubber tube 37, by fluid pressure in the manner of this invention, means are provided for introducing a fine continuous stream 38 of fluid at the central axis of the advancing rubber mass 13. For purposes of illustration, the fluid is hereinafter represented as being a liquid. This stream of liquid 38 is introduced through a hollow needle 39, which extends forwardly from the spider ring assembly 15. The spider ring assembly, which fits into a recessed portion of the extruder head 24, consists of an outer ring 40, and a number of spokes 41 which support a central hub 42. The central hub 42 has a forwardly tapered portion 43 extending into the die 16 on the central axis thereof, and the hollow needle 39 extends a short distance into the confining tube 17 from this tapered portion 43.

In order to feed a suitable shaping liquid, for example, glycerine, contained in a reservoir 44, through the hollow needle 39, there is provided a variable speed pump 45, driven by a suitable motor 46. This pump is of the positive delivery type, such as a gear pump, and may be critically adjusted to deliver the desired quantity of liquid at the desired pressure. The pressure is indicated on a pressure gage 47 in a connecting line 48, leading from the pump 45 to a passageway 49 through the spider spoke 41 and the spider hub 42.

As the rubber stock 13 advances from the entrance end of the elongated confining chamber or tube 17 toward the exit end thereof, it is heated to a higher temperature and becomes highly plastic before vulcanization takes place. The stock 13 while in this highly plastic state is shaped into the desired tubular form by the pressure of a body of the liquid introduced into the stock. For this purpose, restricting means is provided, at the exit end of the tube 17, for causing the fine stream of liquid 38, introduced, as explained previously, through the hollow needle 39 at the central axis of the advancing rubber mass, to accumulate within the soft plastic mass of rubber, forming an enlarged bubble 53, which progressively enlarges the interior cavity and thus shapes the rubber mass 13 into the form of a tube 37. The rubber is in its most plastic and easily deformable state at a section of the tube just prior to the area where appreciable vulcanization sets in, and it is at such section of the tube that the body of fluid achieves its maximum diameter. In other words, the liquid bubble forms, in effect, a liquid mandrel supporting the interior of the tube. The liquid bubble 53 and the rubber tube 37 are shown in cross-section within the confining tube 17 in Fig. 4. Suitable restricting means for causing the enlarged bubble 53 to form comprises a pair of driven pinch rolls 54 and 55 which collapse and compress the vulcanized rubber tube 37 as it emerges from the confining tube 17, thereby limiting the flow of liquid from the interior of the plastic rubber mass 13. In this way, the bubble 53 accumulates at the softest part of the plastic mass 13, and develops sufficient hydraulic pressure, by the action of the pump 45, to shape the rubber mass and hold it in the desired form while it becomes vulcanized in the heated confining tube 17.

As shown in the detailed view of Fig. 5, the tube 17 is cut away at its exit end in the form of curves 56 which closely engage the rolls 54 and 55, so that the vulcanized rubber tube 37 is compressed to the desired degree immediately upon issuing from the confining tube 17. Since the rubber tube 37 is vulcanized, it regains its shape by reason of its own elasticity immediately after passing from the pinch rolls, as shown in Fig. 1.

In order to drive the pinch rolls 54 and 55 at the desired speed, there is provided a motor 60 and a variable speed transmission 61 which is connected by a driving shaft 62 to a gear box assembly 63. As shown in Fig. 6, the rotation of the driving shaft 62 is transmitted to the upper pinch roll 54 through bevel gears 64 and 65, and upper roll shaft 66. In order to drive the lower pinch roll 55 at the same speed as, and in the opposite direction to the upper roll 54, there is provided in the gear box 63 a train of gears 67, 68, 69, and 70, which rotate in the directions indicated by the arrows in Fig. 7. The gear 67 on the upper pinch roll shaft 66 drives the idler gears 68 and 69 on shafts 71 and 72 respectively, and the gear 69, in turn, drives the gear 70 on lower pinch roll shaft 73.

By adjusting the variable speed transmission 61, the speed of the pinch rolls 54 and 55 can be regulated. These pinch rolls grip the vulcanized rubber tube 37 tightly, and the speed of the rolls determines the rate at which the rubber tube passes from the confining and vulcanizing tube 17. This regulation of the speed of emergence of the rubber tube 37 affords a means of varying at will the wall thickness of the rubber tubing being produced. The reason why this is possible will be understood from consideration of the fact that, under steady operating conditions, the volumetric rate of flow of rubber into the confining tube 17 is necessarily the same as the volumetric rate of flow of rubber out of the tube. Hence, for a given constant rate of introduction of vulcanizable stock into the confining tube, the wall thickness of the vulcanized product 37 will vary inversely with the linear speed at which the product is withdrawn from the confining tube. Thus, if the product 37 is permitted to emerge at a very much faster rate than the rate at which stock 13 is introduced into the tube 17, then the product will have a thin wall; as the speed of emergence is decreased, the wall of the product becomes thicker. Thus, the present extrusion method and apparatus permit easy adjustment of the wall thickness of the extruded vulcanized tubing. In this way tubing of a variety of wall thicknesses can be manufactured in the one apparatus, thereby simplifying factory operations and effecting economies in production.

When a centrally located liquid bubble 53 is used to shape the tubing in the manner of this invention in place of a solid core or mandrel within a die passageway in the conventional manner, the passage within the tubing is accurately centered. By this method the problem of maintaining a long solid core or mandrel in proper concentricity with the outer tube 17 is avoided, and wastage of material due to improperly formed tubing is minimized.

Under steady operating conditions, the rate of introduction of the liquid stream 38 by the pump 45 is such as to just replace the small amount of liquid which escapes through the compressed rubber tube 37 as it passes between the pinch rolls. The desired hydraulic shaping pressure in the liquid body 53, within the rubber mass, is maintained by the squeezing action of the pinch rolls 54 and 55. This pressure may be maintained at a desired level, by adjusting the pressure exerted by the pinch rolls. To this end, the shaft 73 of the lower pinch roll 55 is made adjustable with respect to the shaft 66 of the upper pinch roll 54, so that the distance between the two rolls may be varied as desired.

A convenient way of accomplishing this is indicated in Figs. 6 and 7 wherein the lower pinch roll shaft 73 is shown rotatably supported on two arms 74 and 75 which are pivotally mounted on the lower idler gear shaft 72, and which are rigidly connected by a crosspiece 76, the entire assembly forming a pivoted yoke. The position of the pivoted yoke, and hence of the roll shaft 73, may be critically adjusted by means of an adjusting screw 77 which is threaded through the wall of the gear box at 78. The roll shaft 73 is spring loaded by a compression spring 79 fixed to the wall of the gear box 63 at one end and fixed to the yoke crosspiece 76 at the other end. The spring 79 and the adjusting screw 77 fit into a recessed portion 80 of the crosspiece 76.

After passing from the pinch rolls, the vulcanized rubber tube 37 may be cut into convenient lengths, and the small amount of liquid which passes through the nip of the pinch rolls may be permitted to drain out of the tubing, or it may be washed out, before the tubing is packaged for sale.

The lubricant introduced between the outer surface of the advancing rubber mass 13 and the inner walls of the confining tube 17 by the lubricant pump 27 is permitted to pass out at the exit end of the tube 17. The amount of lubricant which is thus passed through the tube 17 is very small, since only a thin film of lubricant is desired between the tube and the advancing rubber. The surfaces of the pinch rolls 54 and 55 are preferably knurled or ridged so that the lubicant will not tend to cause the rubber tube 37 to slip between the rolls, which would destroy the controlling effect of the speed of the rolls on the rate of emergence of the rubber product. The pinch rolls therefore grip the rubber product firmly as it emerges fom the confining tube, and thereby limit the speed of emergence of the product from the confining tube.

A method of starting and operating the apparatus will now be described. As the vulcanizable rubber stock 13 is started into the confining tube 17 by the stuffer screw 11, the variable speed lubricant pump 27 is adjusted to deliver lubricating liquid from the reservoir 26 at a relatively rapid rate, so that there is an excess of lubricant around the advancing rubber mass. At the same time, the fine stream of shaping liquid 38 is introduced by the pump 45 through line 48, passageway 49, and the hollow needle 39. The rubber mass, surrounded by lubricant and having a fine stream 38 of liquid deposited along its central axis, advances through the heated tube 17. When the leading end of the rubber has passed through the pinch rolls 54 and 55, the variable speed lubricant pump 27 is adjusted so as to introduce to the surface of the passing rubber only a very small amount of lubricant, sufficient to form a thin, continuous lubricating film, having a thickness of, say, about .0008 inch. The resistance to flow of rubber from the tube 17 created by the pinch rolls causes the rubber mass to fill up entirely the vulcanizing tube 17, displacing the excess lubricant which was introduced at the start of the process, and permitting pressure to be developed within the tube. In other words, the pinch rolls serve as a restriction or snubbing device at the exit end of the tube, thereby causing back-pressure to be developed within the tube as a result of the squeezing action exerted on the rubber by the extruder screw. The tube is heated to such a temperature that the rubber becomes vulcanized before reaching the exit end of the tube. It will be understood that speed of extrusion and the rate of heating of the elongated confining die will be so correlated that the rubber stock becomes substantially vulcanized in the time that it takes the stock to traverse the length of the die.

The stream of liquid 38 passes along with the advancing rubber to the exit end of the tube and through the pinch rolls 54 and 55. The pressure exerted by the pinch rolls is adjusted by means of the adjusting screw 77 so that the flow of liquid from the interior of the rubber mass in the confining tube 17 is restricted, and an enlarged liquid bubble 53 collects within the plastic rubber mass 13. In this way the rubber is shaped, by hydraulic pressure, in the form of a tube 37 which becomes at least partially vulcanized before it leaves the confining tube 17. Since the vulcanization takes place under pressure, a dense homogeneous product is obtained.

The variable speed transmission 61 is adjusted, as mentioned previously, to drive the pinch rolls 54 and 55 at a rate corresponding to the desired rate of withdrawal of rubber from the chamber 17, in order that the rubber tube 37 will have the desired wall thickness.

Under steady operating conditions, typical hydraulic shaping pressures and lubricant pressures as registered on the gauges 31 and 47, may be, for example, from 50 to 200 p. s. i. The fluid used to shape the rubber may be any suitable liquid or gas not deleterious to the rubber compound, e. g. glycerine, water, steam, nitrogen, silicone, mold release fluids, etc.

The confining tube 17, instead of being round in cross-section, may have other desired forms to produce articles of different shapes.

Materials other than rubber may be employed in this process, such as thermoplastic resins having somewhat rubbery properties at room temperature. In this case the confining chamber 17 may be cooled instead of heated, and the thermoplastic material may be introduced thereto in a heated, highly plastic state. The shaping bubble 53 will form within the mass in the heated plastic state, and the thus shaped plastic will be cooled sufficiently to retain its shape before emerging from the confining chamber.

Thermosetting resins may be employed if desired, notably those which have sufficient elasticity after curing to undergo compression at the exit end of the confining chamber without becoming permanently deformed.

The invention is particularly well adapted to the manufacture of gum rubber articles which have previously been manufactured by relatively inconvenient and inefficient processes involving wrapping of the shaped gum rubber article with cloth or the like during vulcanization. Gum rubber tubing can be made more conveniently and economically by this method and the product has a superior appearance to that made by conventional processes, being smooth and glossy on its inner and outer surfaces. This is of particular advantage in tubing for surgical use, since the smooth surfaces facilitate cleaning and sterilizing the tubing.

From the foregoing description, it is evident that the process and apparatus of this invention are susceptible of many modifications, and afford a convenient means of continuously manufacturing a wide variety of shaped articles having a hollow interior. Because the articles are shaped under pressure in a confining chamber, dense, homogeneous products free from internal defects or discontinuities are obtained. The passage of the article through a lubricated confining chamber while being shaped results in products having smooth glossy surfaces, such as have heretofore been obtainable only by processing short lengths of material in closed molds under pressure.

Having thus described my invention, what I claim and desire to protect by Letters Patent is:

1. In a method of shaping continuous lengths of articles of rubbery material having an annular outer wall and a longitudinal central cavity, the steps of shaping the article by extruding an initially shapeless mass of the material in a plastic state into an elongated shaping passageway, the plastic rubbery material being maintained under pressure within the said elongated shaping passageway so that it tends to fill out the entire passageway as a solid mass in confining engagement with the walls of the passageway, introducing a stream of fluid into the material within the passageway, allowing the stream of fluid to accumulate to form a fluid bubble within the material, whereby a longitudinal central cavity of the desired size is created in the material in the plastic state, and thereafter causing the material in the passageway to change from a plastic state to a sufficiently elastic state to regain its shape after deformation on emerging from the said passageway.

2. A method of extruding hollow articles of plastic material which comprises extruding a cylindrical mass of a plastic material and simultaneously confining a length of the material under pressure in a relatively soft, heated, plastic state so that it tends to form a solid cylindrical mass while so confined, inserting a quantity of liquid into the confined cylindrical mass to transform the mass into a tube by internal fluid pressure, and causing the confined material to change from a soft, plastic state to a relatively elastic, shape-retaining state.

3. A method of extruding shaped plastic articles having a longitudinal cavity comprising the steps of forcing an initially shapeless mass of the plastic material into and through an elongated confining chamber, the plastic material being maintained under back-pressure in the said confining chamber so that it tends to fill out the chamber entirely as a solid mass, introducing a continuous, centrally longitudinal stream of fluid into the plastic material in the confining chamber, compressing the plastic material laterally as it passes from the confining chamber, so as to restrict the flow of said fluid from the chamber and thus cause a longitudinal bubble of the said fluid to form within the plastic material, thereby creating a longitudinal cavity in the plastic material, and, concurrently with the passage of the plastic material through the confining chamber, curing the plastic material to change it progressively from a plastic state to a sufficiently elastic state to regain its shape after compression.

4. A method of continuously extruding rubber articles having a longitudinal cavity comprising the steps of forcing a stream of the rubber in the plastic state into and through an elongated confining passage, exerting pressure on the rubber in the plastic state within the confining passage so that the rubber tends to fill out the confining passage entirely as a solid mass, introducing a continuous, centrally longitudinal stream of fluid into the rubber in the confining passage, compressing the rubber as it passes from the confining passage to limit the flow of said fluid from the confining passage, thus causing a longitudinal fluid bubble to form within the rubber in the plastic state and thereby shaping a longitudinal cavity in the rubber, and concurrently heating the rubber in the confining passage to effect vulcanization.

5. A method of shaping tube-like vulcanized rubber articles comprising the steps of passing an initially shapeless mass of rubber in the plastic state through an elongated confining tube, the said rubber in the plastic state being maintained under back-pressure within the said elongated confining tube so that it tends to fill out the tube entirely in close engagement with the walls of the tube as an essentially solid mass, flowing a continuous stream of incompressible fluid centrally into the rubber as it passes into the said tube, restricting the flow of said incompressible fluid from the tube so that an enlarged body of said fluid accumulates within the rubber in the plastic state, thereby converting the rubber mass into a desired tube-like form while it is still in the plastic state, introducing a film of liquid lubricant between the wall of the confining tube and the outer surface of the passing rubber to prevent sticking thereof to the tube, and vulcanizing the rubber at least partially in the tube.

6. In an apparatus for making continuous lengths of articles having a hollow longitudinal cavity from extrudable material by forcing the material while in a plastic state through an elongated confining and shaping chamber, the combination which comprises an external die member for extruding a stream of the plastic material into said chamber, means for introducing a stream of fluid into the material in the chamber, and means for restricting the flow of said extrudable material and said fluid from the chamber to cause the said stream of fluid to enlarge to form a fluid bubble in the material and to cause the material to fill out the confining and shaping chamber in pressurized engagement with the internal walls thereof, the pressure of the said bubble acting to form the desired longitudinal cavity in the material in the plastic state.

7. In an apparatus for making continuous lengths of articles having a hollow central axial cavity from plastic material by passing the material through an elongated die, the combination which comprises an external die member for extruding a stream of the plastic into said die, means for flowing a central longitudinal stream of fluid into the passing material while in a plastic state, means for compressing the article as it passes from the exit opening of the die to limit the flow of said fluid from the die and to limit the emergence of the plastic material from the die, thereby causing the plastic material to fill out the die in pressurized engagement with the internal walls thereof, and thereby causing an accumulation of the said fluid which creates the desired cavity within the plastic material by fluid pressure, and means for causing a change in the physical state of the plastic material in the die, at the location of said accumulation of fluid, from a plastic state to a sufficiently elastic state to regain its shape after said compression.

8. In an apparatus for extruding lengths of hollow rubber articles by forcing the rubber through an elongated confining chamber, the combination which comprises an external die member for extruding a stream of the rubber into the said confining chamber, means for passing a stream of fluid into the rubber in the chamber, means for restricting the flow of fluid from the chamber and for restricting the passage of rubber out of the chamber, thereby causing the rubber to fill out the chamber under pressure and creating an accumulated body of fluid within the rubber which shapes the rubber in the chamber by fluid pressure, means for vulcanizing the rubber in the chamber, and means for introducing a film of lubricant between the wall of the chamber and surface of the passing rubber.

9. In an apparatus for extruding continuous lengths of tube-like rubber articles by forcing the rubber through an elongated shaping passageway, the combination which comprises an external die member for extruding a stream of the rubber into said passageway, means for passing a stream of fluid into the rubber in the passageway, means for compressing the rubber article as it emerges from the passageway to restrict the flow of rubber and said fluid from the passageway, thereby causing the rubber to fill out the passageway in pressurized engagement with the walls thereof, and causing a bubble of the said fluid to form in the rubber to shape the rubber to a tube-like article while it is in the plastic state, means for vulcanizing the rubber in the passageway, and means for lubricating the outer surface of the rubber as it passes through the passageway.

10. An apparatus for extruding rubber tubing and the like comprising an elongated shaping and confining chamber, an external die member for extruding a stream of the rubber into the chamber, means for forcing the rubber under pressure into and through the chamber in close confining engagement with the interior walls of the chamber, means for introducing a film of lubricant between the surface of the rubber and the walls of the chamber, means for introducing a central stream of fluid into the rubber under pressure in the chamber, means for heating the chamber to vulcanize the rubber, and means for compressing the rubber after it emerges from the chamber to restrict the flow of said fluid therefrom and thereby form an accumulated bubble of the said fluid within the rubber, said bubble shaping the rubber in the chamber in the plastic state in the desired tube-like form by fluid pressure.

11. An apparatus for extruding rubber tubing and the like comprising an elongated die extension tube, an external die member for extruding a stream of rubber into the die extension tube, means for forcing rubber under pressure into and through the external die and die extension tube, means for lubricating the surface of the rubber as it passes through the die, a central hollow needle extending into the entrance end of said die extension tube for introducing a small central stream of liquid into the passing rubber, means for heating the tube to vulcanize the rubber as it passes through the tube, a pair of pinch rolls engaging the exit end of the die extension tube, said rolls acting to compress the rubber at it passes from the die extension tube, thereby restricting the flow of rubber and of said liquid from the die extension tube and causing an enlarged bubble of said liquid to form within the rubber while confined under pressure in the plastic state within the tube, the hydraulic pressure of said liquid bubble acting to shape the plastic rubber in the desired tube-like form.

12. A method of forming tubes from thermosetting elastic material, comprising the steps of continually advancing an initially shapeless mass of the material in a plastic state under pressure into an elongated confining chamber having the cross-sectional size and shape of the desired tube, heating the advancing material in said chamber to a soft, readily, deformable state, introducing a continuous central longitudinal stream of fluid into the soft, plastic mass in the confining chamber, restricting the flow of said plastic mass from the confining chamber so that the plastic tends to fill out the chamber entirely in engagement with the walls of the confining chamber, restricting the flow of said fluid from within the mass so that an enlarged body of said fluid forms within the plastic mass while it is confined in the said chamber, thereby creating a longitudinal cavity within the advancing plastic mass so that a tubular shape is imparted thereto, introducing a thin film of lubricating liquid between the wall of the confining chamber and the surface of the advancing plastic mass in contact therewith to prevent sticking of the plastic to the wall of the chamber, continuing said heating of the advancing soft plastic mass in said tubular form until the plastic mass becomes thermoset to a self-supporting but elastic state, so that it retains its shape upon emerging from said confining chamber, and controlling the rate of emergence of the advancing thermoset plastic tube from the confining chamber to regulate the wall thickness of the said tube.

13. A method of extruding hollow articles of plastic material which comprises extruding a cylindrical mass of the plastic material and simultaneously confining a length of the material under substantial pressure so that it tends to form a solid cylindrical mass, inserting a quantity of liquid into the confined cylindrical mass to transform the mass into a tube by internal fluid pressure, while maintaining the outside diameter of the mass constant, and then causing the confined material to change from a soft, plastic state to a relatively elastic, shape-retaining state.

14. An apparatus for extruding rubber tubing and the like comprising in combination an elongated shaping and confining chamber of constant internal diameter, an external die member at the entrance to said chamber defining a die passageway for extruding a solid stream of the rubber into the said chamber, means for forcing the rubber under pressure into and through the external die and the chamber under such pressure that the rubber tends to fill out the said chamber entirely as a solid mass, means for introducing a film of lubricant between the surface of the rubber and the walls of the chamber, means for introducing a central stream of fluid into the rubber in the chamber, means for heating the chamber to vulcanize the rubber, and means for compressing the rubber after it emerges from the chamber to restrict the flow of fluid therefrom and thereby form an accumulated bubble of fluid within the rubber, said bubble shaping the rubber in the chamber in the plastic state in the desired tube-like form by fluid pressure.

15. A method of making vulcanized rubber tubing having a definite wall thickness, comprising in combination the steps of heating an initially shapeless mass of vulcanizable rubber stock to extruding temperature, forcibly extruding a stream of the heated rubber mass into and through a greatly elongated tubular confining and shaping die, the rubber stock within said die being forced into pressurized confining engagement with the interior wall of the said die throughout its length, continuously introducing a thin film of lubricant between the surface of the stock and the wall of the die to prevent frictional contact between the surface of the rubber stock and the wall of the die, heating the die so that the stock passing through the die is progressively further heated from the aforesaid extrusion temperature to vulcanizing temperature, the relation between the rate of heating of the die, the speed of extrusion, and the length of the die, being such that the stock emerges from the die in a vulcanized condition, squeezing the vulcanized rubber stock as it emerges from the exit end of the die to create a definite resistance to flow of material out of the die and thereby developing a definite back-pressure in the material within the die, continuously introducing a fine stream of fluid at the center of the heated rubber stock as it passes into the entrance to the die, the aforesaid squeezing action on the rubber at the exit end of the die causing the fine stream of fluid to become enlarged to form a bubble of definite diameter within the rubber stock in the elongated die at a portion of the elongated die where the heated rubber is in the softest condition, such softest condition occurring just prior to the time the rubber becomes vulcanized, whereby the rubber stock becomes vulcanized in the form of a tube, the internal diameter of the tube being determined by the said diameter of the fluid bubble, and the external diameter of the tube being determined by the internal diameter of the elongated die.

MARK W. OLSON.

REFERENCES CITED

The following references are of record in the file of this patent:

UNITED STATES PATENTS

| Number | Name | Date |
|---|---|---|
| 2,047,554 | Fischer | July 14, 1936 |
| 2,337,927 | Reichel et al. | Dec. 28, 1943 |
| 2,365,375 | Bailey et al. | Dec. 19, 1944 |
| 2,461,976 | Schenk | Feb. 15, 1949 |

FOREIGN PATENTS

| Number | Country | Date |
|---|---|---|
| 3,999 | Great Britain | of 1891 |